May 6, 1958   J. D. HEIBEL ET AL   2,833,676
METAL COATED DIELECTRICS AND METHOD FOR PRODUCING SAME
Filed Aug. 17, 1954
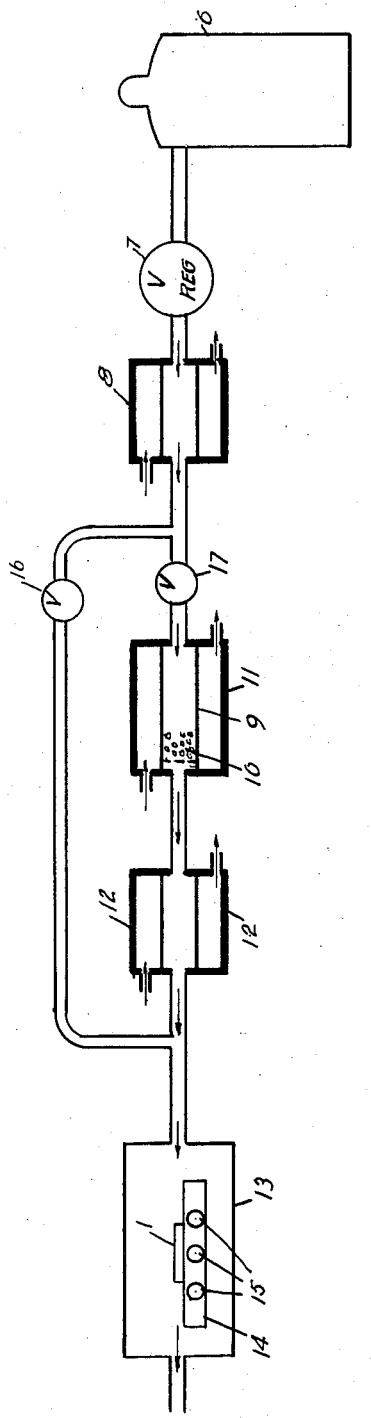
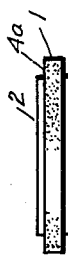
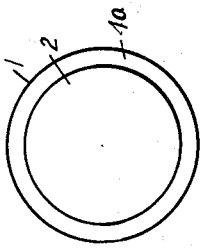
INVENTORS
Jerome D Heibel
BY John W Schell
Ralph Hammar
Attorney 2,833,676

METAL COATED DIELECTRICS AND METHOD FOR PRODUCING SAME

Jerome D. Heibel and John W. Schell, Erie, Pa., assignors to Erie Resistor Corporation, Erie, Pa., a corporation of Pennsylvania Application August 17, 1954, Serial No. 450,334

4 Claims. (Cl. 117—213)

This application is a continuation-in-part and substitute for application Serial No. 284,354, filed April 25, 1952, and now abandoned.

Titanate ceramic bodies such as barium titanate have been used in electrical condensers and piezoelectric devices and in both uses require initimate metal coatings which serve as electrodes. The requirement of intimate contact results from the very high dielectric constant of the barium titanate, e. g. 1800 at room temperature. Any intervening air or low dielectric constant material materially lowers the effective or resultant dielectric constant of the titanate body in series with the intervening low dielectric constant material. Electrolytic methods are not open, because of the possibility that some of the conductive electrolyte might remain in the titanate. Also, in order to effect an electro plate, the surface must have previously been made conducting. Metalized coatings applied by the techniques of the ceramic decoration art have been limited to silver, because silver oxide reduces directly to the metal at sintering temperatures. Copper has not been used, because it oxidizes so readily at the sintering temperatures and at these temperatures a reducing atmosphere would reduce the titanate and destroy, or at least greatly decrease its dielectric properties. While silver has been extensively used, there are objections. Silver has a tendency to migrate into the ceramic. The flux, which holds the sintered silver to the ceramic, is of low dielectric constant. It is difficult to solder to the silver without breaking the flux bond to the ceramic.

This invention is intended to improve the dielectric and piezoelectric properties of titanate bodies by applying pyrolytic oxide free copper electrodes in an atomic or molecular form so the electrodes will follow all of the surface irregularities and produce electrodes in which there is no intervening low dielectric constant material.

In the accompanying drawing, Fig. 1 is a plan view of a titanate condenser; Fig. 2 is an edge view; Fig. 3 is a fragmentary section through the titanate body and a portion of its electrode; and Fig. 4 is a diagrammatic view of the apparatus for applying the electrode coating.

In the drawing, 1 indicates the titanate dielectric body shown as a circular disk having applied on opposite faces thereof electrode coatings 2 and 3 which in practice are applied throughout the central portion, but short of the periphery of the ceramic body 1 so as to leave an insulating band 4a. The dielectric body and electrode coatings are, of course, subject to a variety of changes in shape depending upon the end use.

Although the surface of the ceramic body 1 to be electroded may be lapped or polished so as to remove surface irregularities, there will nevertheless remain as shown in Fig. 3 substantial surface irregularities as indicated by the reference numerals 4. These irregularities are, of course, greatly magnified in Fig. 3 but nevertheless do exist in any body. If the electrodes were applied by the ceramic paint technique, the irregularities 4 would be filled to some extent with the glaze or ceramic flux carrying the sintered metal particles. Also, the glaze would have to have some thickness and since the glaze has a low dielectric constant, this would decrease the effective dielectric constant measured between the electrodes. If the electrodes are applied by the metal evaporating technique, the metal droplets evaporated or sintered onto the ceramic surface may be large enough to bridge the irregularities 4 resulting in air between the electrodes and the ceramic, which likewise decreases or dilutes the effective dielectric constant appearing between the electrodes. As indicated by the heavy line 5 in Fig. 3, in accordance with the present invention, the electrodes follow all of the surface irregularities so that nothing intervenes between the electrodes and the surface of the ceramic to decrease the effective dielectric constant appearing between the electrodes. This result is achieved by applying the electrodes with the process known as gas plating in which a metal compound in vapor phase is brought into contact with the ceramic surface which has been heated to a temperature above the break-down temperature of the compound. Upon contacting the heated ceramic surface, the metal compound breaks down by pyrolysis and deposits a metal coating in atomic or molecular form upon the ceramic. Because the vapor must be in intimate contact with the ceramic before the pyrolysis can take place, the particles of metal deposited are in intimate contact with the ceramic and the dimensions of these particles are so small compared to the dimensions of the surface irregularities on the ceramic that the resultant metal coating follows the ceramic surface perfectly. The result of the electrode coatings, which intimately contact and follow the surface of the dielectric, is an increase of from 5% to 20% in the effective dielectric constant appearing between the electrodes and similar increases in the coupling coefficient of polarized barium titanate, which exhibits piezoelectric properties. These results are achieved by eliminating any low dielectric constant material between the metal electrodes and the ceramic dielectric.

In Fig. 4 is shown diagrammatically apparatus by which the electrodes 2 and 3 can be applied. In this apparatus, an inert gas such as nitrogen, carbon dioxide, argon, and the like in a pressure vessel 6 is fed through a regulator 7 and heat exchanger 8 into a carburetor 9 containing crystals 10 of a copper compound having the property of vaporizing at a temperature below that which it breaks down by pyrolysis. Examples for this class of compounds are copper salt of dibutyryl methane ($C_{18}H_{30}O_4Cu$) and copper acetyl acetonate. Carbon dioxide is ordinarily used because it is one of the cheapest of the inert gases. The carburetor 9 is likewise surrounded by a heat exchanger 11 which like the heat exchanger 8 is kept at a temperature below the decomposition temperature of the copper compound. For the copper salt of dibutyryl methane, the vaporizing temperature is about 450° F. and the pyrolytic decomposition temperature is about 485° F. Copper acetyl acetonate has a vaporizing temperature of 446° F. and a pyrolytic decomposition temperature of 455° F. There is a partial vapor pressure below the temperature of complete vaporization. When copper acetyl acetonate is used, the heat exchangers 8 and 11 will be operated at a temperature of from 325° F. to 425° F., which is both below the vaporizing temperature (446° F.) of the copper acetyl acetonate and well below the decomposition temperature (455° F.) of the copper acetyl acetonate. When the copper salt of dibutyryl methane is used, the heat exchangers 8 and 11 will ordinarily be operated at 450° F. which is safely below the pyrolytic decomposition temperature of 485° F. The temperature of the carburetor 9, which is the same as the heat exchanger 11, is below or equal to the vaporization temperature of the copper compound, but is high enough so that some of the copper compound vaporizes into the hot inert carrier gas and is low enough to keep the carbureted mixture below the pyrolytic breakdown temperature of the copper compound. The inert gas flows through the carburetor 9 and picks up copper compound vapor and the carbureted mixture flows through another heat exchanger 12 into a chamber 13. The chamber 13 is ordinarily heated to very nearly the vaporizing temperature of the copper compound, but is kept below the thermal or pyrolytic breakdown temperature. The purpose of the heat exchanger 12 is to prevent crystallization of the copper compound vapor out of the carbureted mixture. Within the chamber 13 is a metal platen 14 heated, for example, by cartirdge electric heating elements 15 and maintained at a temperature well above the thermal decomopsition temperature of the copper compound. On the metal platen rests one or more of the ceramic disks 1. No effort has been made to illustrate the thermostatic control for the heating elements 13 which control the temperature of the platen 14 to a temperature of about 800° F. for copper acetyl acetonate or a temperature of about 500° F. for copper dibutyryl methane, nor has any attempt been made to illustrate the temperature controls for the other heat exchangers 8, 11, and 12, since these are well understood. Other expedients can be used for heating the ceramic.

In the use of the apparatus, the chamber 13 is first purged with inert gas by opening a valve 16 and closing a valve 17 so that the heated inert gas can flow through the chamber. The purpose of this is to remove adsorbed oxygen from the surface of the ceramic 1 resting on the platen 14. The inert gas removes the adsorbed oxygen by substitution of adsorbed inert gas for adsorbed oxygen. The art of removing adsorbed oxygen is old in the vacuum tube art and many expedients are known. Because it is only important that adsorbed oxygen be removed, it may be more economical to do this by the substitution process of purging with inert gas rather than by removal of all adsorbed gases as is required in many cases in the vacuum tube art. If the adsorbed oxygen is removed by substitution, after a suitable purging period, which will depend upon the absolute pressure within the chamber 13, the valve 16 is closed and the valve 17 is opened to cause the gas to flow through the carburetor 9 and to discharge the carbureted vapor into the chamber 13. The carbureted mixture of copper compound vapor and inert gas upon its arrival at the chamber 13 is heated just short of the pyrolytic breakdown temperature of the copper compound. As the vapor comes into contact with the surface of the ceramic 1, which is heated by the platen 14 to a temperature above the pyrolytic decomposition temperature of the copper compound, the vapor quickly breaks down into free copper and volatile radicals. At the time of breakdown, the vapor must be in intimate contact with the surface of the ceramic, as otherwise the vapor would not be heated to the temperature at which it breaks down by pyrolysis. The free copper radical, at the time of breakdown, is in atomic or molecular form and would be exceedingly reactive if there were compounds around with which it could react. Because the adsorbed oxygen has previously been removed from the surface of the ceramic 1, there is nothing available for the copper radical to react with and the copper accordingly adheres to the ceramic surface by reason of its intimate contact therewith. The dimensions of the copper deposited by the copper compound vapor are so small that all of the surface irregularities of the ceramic are followed and the resultant coating has nothing between it and the ceramic. This results in the maximum effective dielectric constant of the ceramic, which as explained above, is from 5% to 20% better than has heretofore been obtainable with the best known techniques.

The characteristics of the copper coating are different from coatings deposited by evaporating or sputtering copper where the particle size is much greater than molecular and accordingly the larger particles bridge surface irregularities and result in a coating in which parts are spaced from the ceramic surface. The coating deposited by pyrolysis from the carbureted gas mixture is carried by the gas into intimate contact with the ceramic surface and follows all of the surface irregularities or pores. As the copper compound breaks down, the copper is released in an atomic or molecular form and the heavy copper molecules upon striking the ceramic surface knock off any lighter adsorbed inert gas molecules so the copper is deposited directly to the ceramic surface without any intervening space which would decrease or dilute the effective dielectric constant of the ceramic.

In order that the copper coating may have the necessary low electrical resistance so that the power factor of the condensers will not be excessive, it is important that adsorbed oxygen be removed from the surface to be coated as otherwise the oxygen will to a considerable extent combine with the copper released from the copper compound vapor and will result in the codeposition of copper and copper oxide. When the oxides of copper are codeposited, the resultant film may have a bright appearance but the power factor of the condenser having such coatings will be objectionably high indicating that the resultant resistance of the film is too high for practical use. The purging of the chamber 13 with inert gas prior to the flowing of the carbureted mixture through the chamber is an economical way of removing the adsorbed oxygen from the ceramic surface by substitution of adsorbed inert gas for the adsorbed oxygen. The adsorbed gas can be removed easier if the chamber is maintained under vacuum but a vacuum is not necessary for the deposition of conductive copper coatings.

It will be understood that some masking of the ceramic would ordinarily be provided so that the finished product would have the insulating band 4a illustrated in Fig. 1. Another alternative is to coat the entire outer surface of the ceramic and then remove parts of the copper coating to provide the insulating band.

What is claimed as new is:

1. In the method of gas plating copper coatings on the surface of titanate ceramic dielectrics by flowing into contact with the heated surface of the ceramic a mixture of inert gas and carbureted vapor of a copper compound having the property of vaporizing at a temperature below that at which it decomposes by pyrolysis, the improvement which consists in first freeing the ceramic surface of adsorbed oxygen by substitution of adsorbed inert gas for the adsorbed oxygen prior to flowing the mixture into contact with the surface whereby the pyrolysis of the copper compound takes place on an oxygen free surface and the resultant copper coating has low resistance characteristic of pure copper rather than high resistance characteristic of a copper coating having codeposited oxides.

2. The method of claim 1 in which the copper compound is copper acetylacetonate.

3. The method of claim 1 in which the copper compound is copper salt of dibutyryl methane.

4. A titanate cermaic dielectric having in direct contact with a surface thereof an electrode coating consisting of an adherent film of oxide free copper following all of the surface irregularities of the ceramic without bridging the irregularities so that nothing intervenes between the film and said surface of the dielectric to decrease the effective dielectric constant of the ceramic, said film having been applied by the method of claim 1.

References Cited in the file of this patent

UNITED STATES PATENTS

| | | |
|---|---|---|
| 2,304,182 | Lang | Dec. 8, 1942 |
| 2,398,382 | Lyon | Apr. 16, 1946 |
| 2,430,520 | Marboe | Nov. 11, 1947 |
| 2,704,727 | Pawlyk | Mar. 22, 1955 |